(12) United States Patent
Salter et al.

(10) Patent No.: US 11,767,069 B2
(45) Date of Patent: Sep. 26, 2023

(54) SPARE TIRE COVER SYSTEMS FOR MOTOR VEHICLES

(71) Applicant: FORD GLOBAL TECHNOLOGIES, LLC, Dearborn, MI (US)

(72) Inventors: Stuart C. Salter, White Lake, MI (US); David Brian Glickman, Southfield, MI (US); Jeffrey Robert Seaman, Brownstown, MI (US); Annette Lynn Huebner, Highland, MI (US); Paul Kenneth Dellock, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1 day.

(21) Appl. No.: 17/534,843

(22) Filed: Nov. 24, 2021

(65) Prior Publication Data
US 2023/0159116 A1 May 25, 2023

(51) Int. Cl.
*B62D 43/02* (2006.01)
*B62D 43/00* (2006.01)

(52) U.S. Cl.
CPC ........... *B62D 43/02* (2013.01); *B62D 43/002* (2013.01)

(58) Field of Classification Search
CPC ..... B62D 43/02; B62D 43/002; B62D 43/005
USPC .............................................. 224/42.12–42.3
See application file for complete search history.

(56) References Cited

U.S. PATENT DOCUMENTS

| | | | |
|---|---|---|---|
| 1,077,285 A * | 11/1913 | Laughlin | B60R 19/40 293/34 |
| 2,991,894 A | 7/1961 | Walker | |
| 6,098,855 A * | 8/2000 | Grabowski | B62D 43/02 40/200 |
| 7,249,927 B2 | 7/2007 | Wooten et al. | |
| 8,020,736 B2 | 9/2011 | Nagase | |
| 9,834,151 B2 * | 12/2017 | Henry | B60R 9/00 |
| 10,363,889 B2 * | 7/2019 | Scheim | H04B 5/0081 |
| 10,616,976 B2 * | 4/2020 | Bertken | H05B 47/105 |
| 2006/0285953 A1 * | 12/2006 | Wooten | B62D 43/02 414/463 |
| 2020/0148289 A1 * | 5/2020 | Evans | B62D 43/02 |

FOREIGN PATENT DOCUMENTS

EP 0800982 A1 * 10/1997
JP 3584956 B2 11/2004

* cited by examiner

*Primary Examiner* — Scott T McNurlen
(74) *Attorney, Agent, or Firm* — Vichit Chea; Carlson, Gaskey & Olds, P.C.

(57) ABSTRACT

Exemplary spare tire cover systems for motor vehicles may include features for assisting in raising/lowering a spare tire to/from a vehicle mounted position. Exemplary system features may include, but are not limited to, a deployable ramp, a wheel stop, a wheel catcher, and a strut assembly for moving the deployable ramp between stowed and deployed positions. The spare tire cover systems may additionally include features designed for increasing the functionality of the system, including but not limited to integrated deployable steps and handrails, lighting, sensors, etc.

18 Claims, 5 Drawing Sheets

SPARE TIRE COVER SYSTEMS FOR MOTOR VEHICLES

TECHNICAL FIELD

This disclosure relates generally to motor vehicles, and more particularly to spare tire cover systems that include features for assisting with raising/lowering a spare tire to/from its vehicle mounted position.

BACKGROUND

Some motor vehicles are equipped with spare tire covers. The spare tire covers may cover a spare tire to protect the spare tire from exposure to environmental conditions.

SUMMARY

A spare tire cover system for a vehicle according to an exemplary aspect of the present disclosure includes, among other things, a base portion, a carrier portion slidable relative to the base portion and configured to support a spare tire, and a deployable ramp configured to move between a stowed position and deployed position relative to the carrier portion.

In a further non-limiting embodiment of the foregoing spare tire cover system, a mounting portion is configured to mount the base portion to a door panel of the vehicle.

In a further non-limiting embodiment of either of the foregoing spare tire cover systems, the carrier portion includes a lug mount that is slidable relative to an inner sleeve of the base portion.

In a further non-limiting embodiment of any of the foregoing spare tire cover systems, the spare tire is mountable to the lug mount.

In a further non-limiting embodiment of any of the foregoing spare tire cover systems, the deployable ramp is received against a wheel catcher of the carrier portion when in the stowed position and is located closer to a ground surface when in the deployed position.

In a further non-limiting embodiment of any of the foregoing spare tire cover systems, the wheel catcher is an integral component of a pivotable top panel of the carrier portion.

In a further non-limiting embodiment of any of the foregoing spare tire cover systems, a light source is secured to the carrier portion.

In a further non-limiting embodiment of any of the foregoing spare tire cover systems, a control module is configured to control a lighting effect emitted by the light source.

In a further non-limiting embodiment of any of the foregoing spare tire cover systems, the deployable ramp includes a wheel stop.

In a further non-limiting embodiment of any of the foregoing spare tire cover systems, the deployable ramp includes a deployable step.

A vehicle according to another exemplary aspect of the present disclosure includes, among other things, a door panel and a spare tire cover system mounted to the door panel. The spare tire cover system includes a deployable ramp adapted to move between a stowed position and a deployed position for assisting in raising/lowering a spare tire to/from a mounted position.

In a further non-limiting embodiment of the foregoing vehicle, a strut assembly is configured to guide the deployable ramp between the stowed position and the deployed position.

In a further non-limiting embodiment of either of the foregoing vehicles, the strut assembly includes a fixed strut, a slotted link, and an assist spring.

In a further non-limiting embodiment of any of the foregoing vehicles, the deployable ramp is received against a wheel catcher of the spare tire cover system when in the stowed position and is displaced from the wheel catcher when in the deployed position.

In a further non-limiting embodiment of any of the foregoing vehicles, the wheel catcher includes a deployable step.

In a further non-limiting embodiment of any of the foregoing vehicles, the deployable ramp includes a wheel stop.

In a further non-limiting embodiment of any of the foregoing vehicles, the deployable ramp includes a deployable step.

In a further non-limiting embodiment of any of the foregoing vehicles, the spare tire cover system includes a top panel adapted to move between a stowed position and a deployed position.

In a further non-limiting embodiment of any of the foregoing vehicles, the top panel includes a deployable handrail.

In a further non-limiting embodiment of any of the foregoing vehicles, the deployed position of the deployable ramp is closer to a ground surface and the deployed position of the top panel is further from the ground surface.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary spare tire cover systems for motor vehicles. Exemplary spare tire cover systems may include features for assisting in raising/lowering a spare tire to/from a vehicle mounted position. Exemplary system features may include, but are not limited to, a deployable ramp, a wheel stop, a wheel catcher, and a strut assembly for moving the deployable ramp between stowed and deployed positions. The spare tire cover systems may additionally include features designed for increasing the functionality of the system, including but not limited to integrated deployable steps and handrails, lighting, sensors, etc. These and other features of this disclosure are described in greater detail below.

Figure 1:
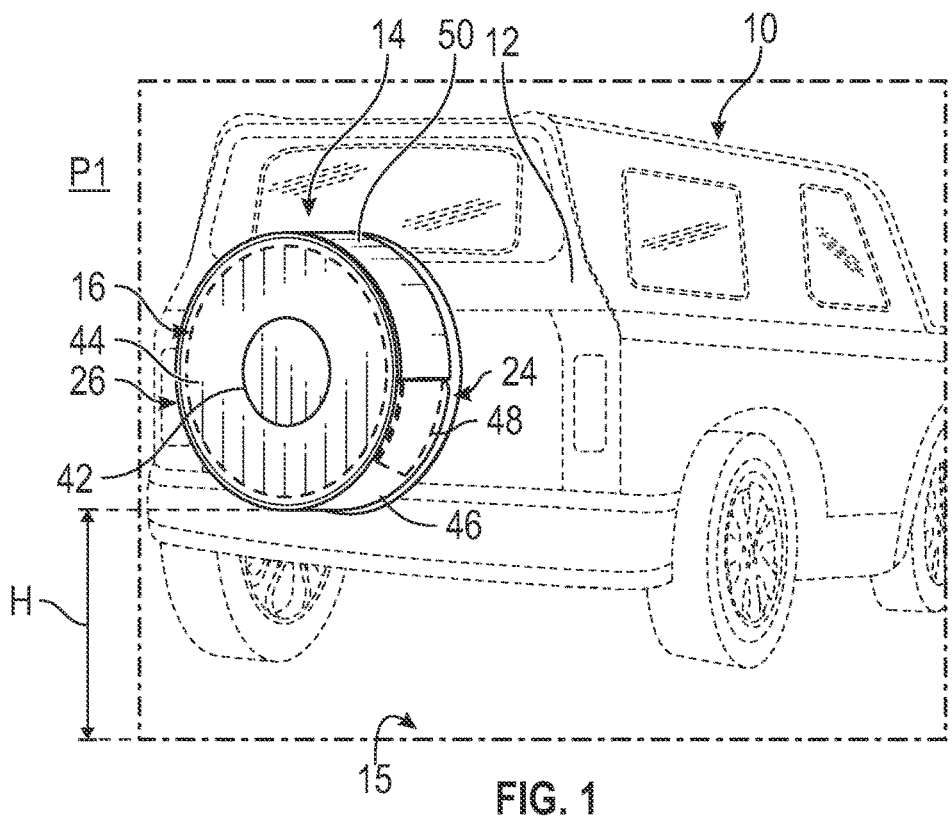
FIG. 1 is a rear perspective view of a motor vehicle equipped with a spare tire cover system.

FIG. 1 illustrates select portions of a motor vehicle 10 (hereinafter referred to simply as "the vehicle"). In an embodiment, the vehicle 10 is a sport utility vehicle (SUV). However, the vehicle 10 could alternatively be configured as a car, a truck, a van, or any other type of vehicle within the scope of this disclosure. The vehicle 10 could also be a conventional motor vehicle, a battery powered hybrid or electric vehicle, or an autonomous vehicle (i.e., a driverless vehicle).

Although a specific component relationship is illustrated in the figures of this disclosure, the illustrations are not intended to limit this disclosure. In other words, the placement and orientation of the various components of the vehicle 10 are shown schematically and could vary within the scope of this disclosure. In addition, the various figures accompanying this disclosure are not necessarily drawn to scale, and some features may be exaggerated or minimized to emphasize certain details of a particular component.

The vehicle 10 includes a rear door panel 12 that may support a spare tire cover system 14. The spare tire cover system 14 may support and cover a spare tire 16 at a height H above a ground surface 15. The spare tire 16 may include both a wheel portion 18 and a tire portion 20 (see FIG. 2) that is received on the wheel portion 18. However, the specific configuration of the spare tire 16 is not intended to limit this disclosure.

Traditionally, spare tire covers have had limited functionality beyond simply covering the spare tire 16 to protect it from environmental conditions (e.g., rain, snow, ice, sunlight, etc.). Moreover, the height H at which the spare tire 16 is supported relative to the vehicle 10 could be high enough that some users may find it difficult to raise and lower the spare tire 16 to/from its mounted position. This disclosure therefore contemplates spare tire cover systems 14 that provide increased functionality and include various features for assisting users when raising/lowering the spare tire 16 to/from its mounted position.

Figure 2:
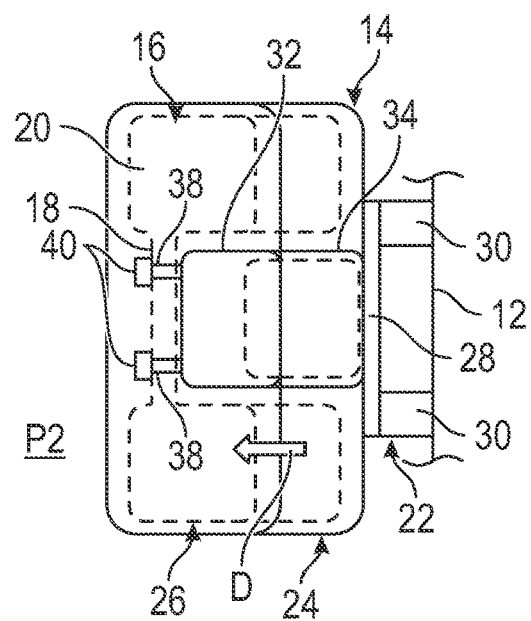
FIG. 2 is a side view of the spare tire cover system of FIG. 1.
Figure 2:

Referring now to FIG. 2, with continued reference to FIG. 1, the spare tire cover system 14 may include a mounting portion 22, a base portion 24, and a carrier portion 26. These and other subcomponents of the spare tire cover system 14 may be made of metallic materials, plastic materials, or a combination of metallic and plastic materials. The material make-up of each subcomponent of the spare tire cover system 14 is thus not intended to limit this disclosure.

The mounting portion 22 may mount the base portion 24 to the rear door panel 12. The mounting portion 22 may include a mounting plate 28 that is mounted directly to the base portion 24, and one or more rack mounts 30 that are mounted directly to the mounting plate 28 and the rear door panel 12.

The carrier portion 26 may be movably mounted relative to the base portion 24 between a first position P1 (shown in FIG. 1) and a second position P2 (shown in FIG. 2). For example, the carrier portion 26 may include a lug mount 32 (e.g., a female part) that is adapted to receive an inner sleeve 34 (e.g., a male part) of the base portion 24. Movement between the carrier portion 26 and the base portion 24 may therefore be guided by the interface between the inner sleeve 34 and the lug mount 32.

The carrier portion 26 may be slid in a rearward direction D relative to the base portion 24. In an embodiment, the rearward direction D is rearward relative to the vehicle 10. Thus, the carrier portion 26 may be slid in a direction away from the rear door panel 12 in order to provide clearance relative to a bumper 36 of the vehicle 10 when unloading/loading the spare tire 16.

The lug mount 32 of the carrier portion 26 may include one or more lugs 38 for securing the spare tire 16 to the carrier portion 26. The spare tire 16 may be secured in place by positioning the lugs 38 through the wheel portion 18 of the spare tire 16 and then attaching lug nuts 40 to the lugs 38. The carrier portion 26 may substantially surround an outer circumference of the spare tire 16 when the spare tire 16 is mounted thereto.

Access to the lug nuts 40 for either securing or removing the spare tire 16 may be achieved through an access cover 42 (see FIG. 1). The access cover 42 may be removably secured to a center panel 44 of the carrier portion 26.

Figure 3:
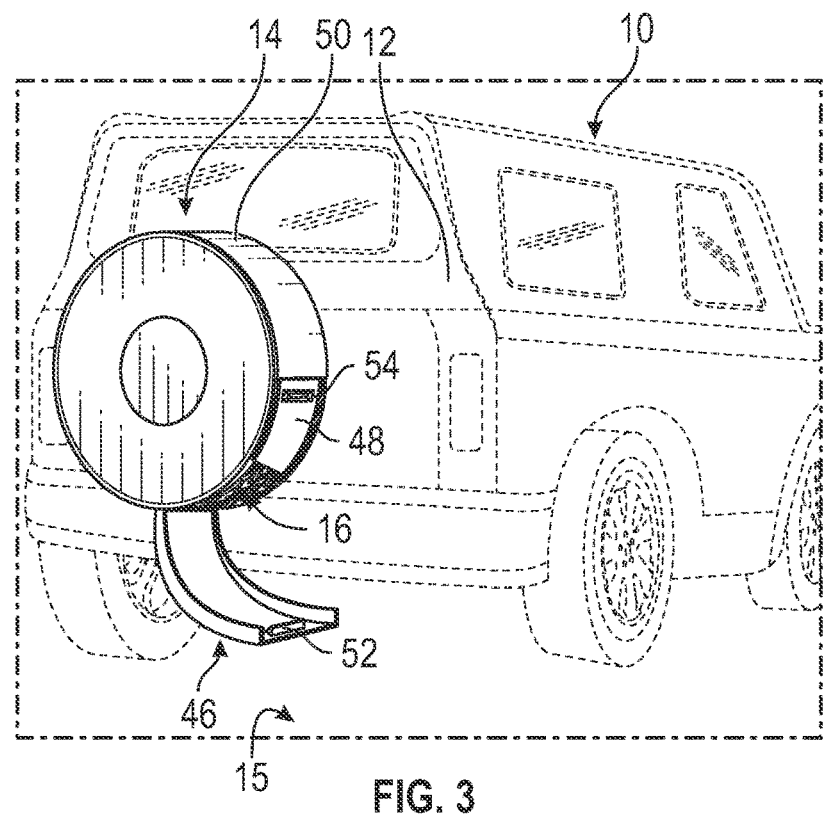
FIG. 3 illustrates a first partially deployed position of the spare tire cover system of FIG. 1.
Figure 4:
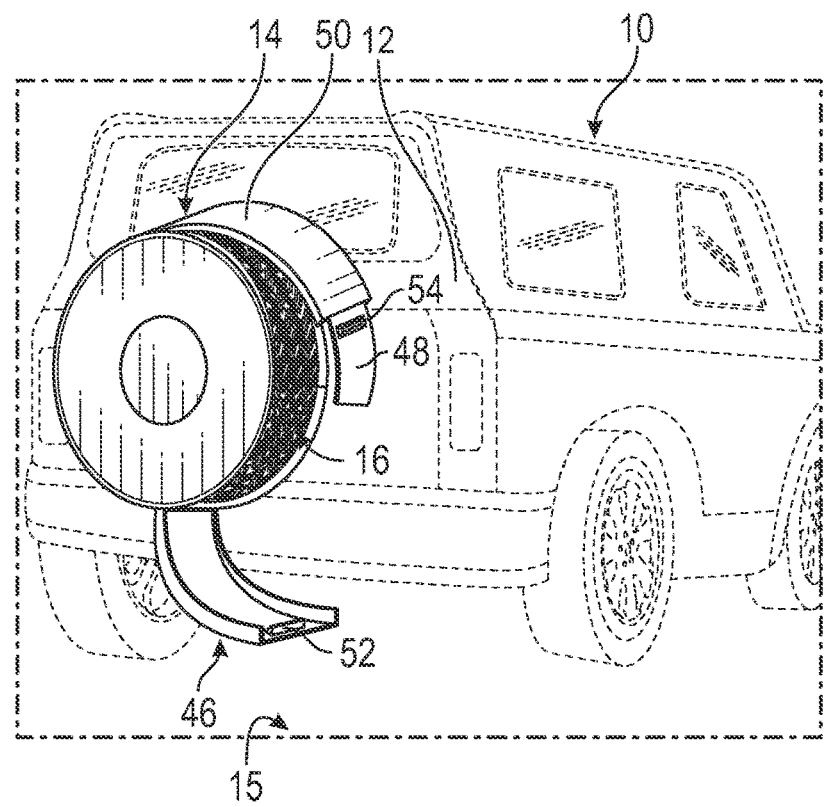
FIG. 4 illustrates a second partially deployed position of the spare tire cover system of FIG. 1.
Figure 5:
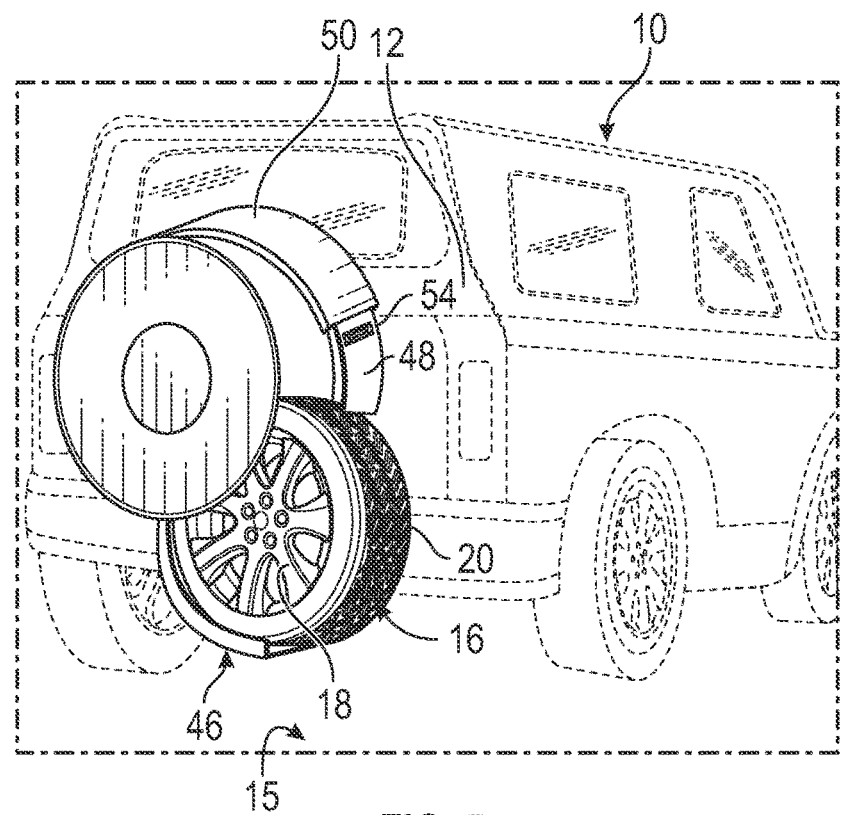
FIG. 5 illustrates a fully deployed position of the spare tire cover system of FIG. 1.

FIGS. 3, 4, and 5 illustrate various features of the carrier portion 26 that facilitate raising/lowering the spare tire 16 to/from its mounted position. For example, the carrier portion 26 may include a deployable ramp 46 that is pivotably connected to portions of the carrier portion 26. The deployable ramp 46 may pivot between a stowed position (shown in FIG. 1) and deployed position (shown in FIG. 3). In the stowed position, the deployable ramp 46 may substantially cover and thus conceal a wheel catcher 48 of a top panel 50 of the carrier portion 26. In the deployed position, the deployable ramp 46 may be located closer to the ground surface 15 and no longer conceals the wheel catcher 48. The deployable ramp 46 may move in a direction that is transverse to a longitudinal axis of the vehicle 10 (e.g., toward either the passenger side or driver side of the vehicle 10) when moved from the stowed position to the deployed position.

The top panel 50 may also be pivotably connected to portions of the carrier portion 26. The top panel 50 may pivot between a stowed position (see FIG. 3) and a deployed position (see FIG. 4). In the stowed position, the top panel 50 may substantially cover portions of the outer circumference of the spare tire 16. In the deployed position, the top panel 50 is rotated slightly open to an ajar position that is further from the ground surface 15 to expose portions of the spare tire 16. The top panel 50 may move in a direction that is transverse to the longitudinal axis of the vehicle 10 (e.g., toward either the passenger side or driver side of the vehicle 10) when moved from the stowed position to the deployed position.

In an embodiment, the wheel catcher 48 is an integral component of the top panel 50. However, the wheel catcher 48 could alternatively be configured as a separate structure from the top panel 50.

The spare tire 16 can be lowered from its mounted position as follows. First, the carrier portion 26 may be moved (e.g., slid rearwardly) from the first position P1 to the second position P2 (see FIGS. 1 and 2). The deployable ramp 46 may then be moved to its deployed position (see FIG. 3). The wheel catcher 48 may prevent premature movement of the spare tire 16 while removing the lug nuts 40, for example, when the deployable ramp 46 is located in the deployed position.

Next, the top panel 50 may be moved to its deployed position (see FIG. 4). The spare tire 16 may then be lowered (e.g., rolled) down the deployable ramp 46 (see FIG. 5) to a position that is relatively close to the ground surface 15. The reverse of the foregoing steps may be performed to raise the spare tire 16 back to the mounted position shown in FIG. 1.

The deployable ramp 46 may include a wheel stop 52 that is configured to prevent the spare tire 16 from unintentionally rolling off the deployable ramp 46 when raising/lowering the spare tire 16. The wheel stop 52 may be accommodated within a slot 54 of the wheel catcher 48 when the deployable ramp 46 and the top panel 50 are located in their respective stowed positions.

Figure 6:
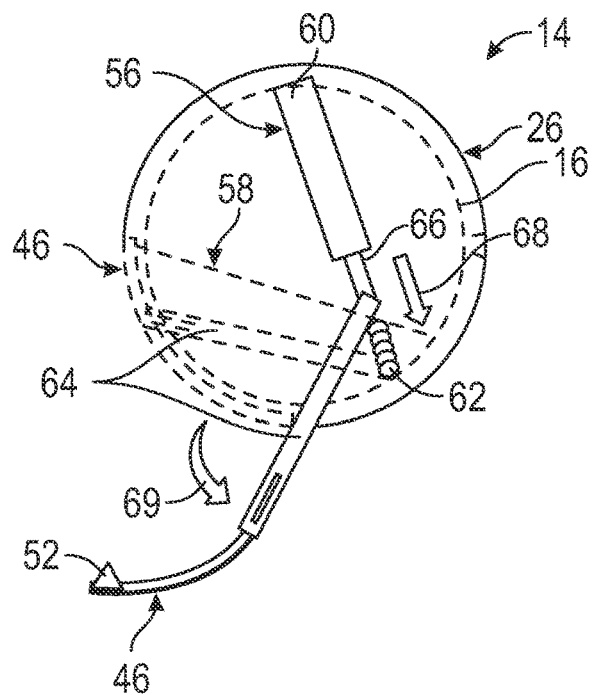
FIG. 6 illustrates an exemplary strut assembly of a spare tire cover system.

FIG. 6 illustrates a strut assembly 56 of the spare tire cover system 14. The strut assembly 56 may control the movement of the deployable ramp 46 between the stowed and deployed positions described above. In this embodiment, the stowed position of the deployable ramp 46 is illustrated using dashed lines, and the deployed position of the deployable ramp 46 is illustrated using solid lines.

The strut assembly 56 may include, among other things, a latch release 58, a fixed strut 60, an assist spring 62, and a slotted link 64. In a default configuration, the fixed strut 60 holds the deployable ramp 46 in the closed or stowed position by fully extending a cylinder 66 (in direction of arrow 68) of the fixed strut 60. The fixed strut 60 may also serve as a closing assist when moving the deployable ramp 46 from the deployed position to the stowed position.

The latch release 58 may actuate the assist spring 62 and thus acts as an opening assist to help lower the deployable ramp 46 from the stowed position to the deployed position, such as when the weight of a user's foot is being applied to the deployable ramp 46. For example, the assist spring 62 may be operably connected to the slotted link 64, which is itself connected to the deployable ramp 46, and may be configured to move the slotted link 64 in a direction of arrow 69 when actuated. The assist spring 62 may automatically reset upon moving the deployable ramp 46 back to the stowed position.

Figure 7:
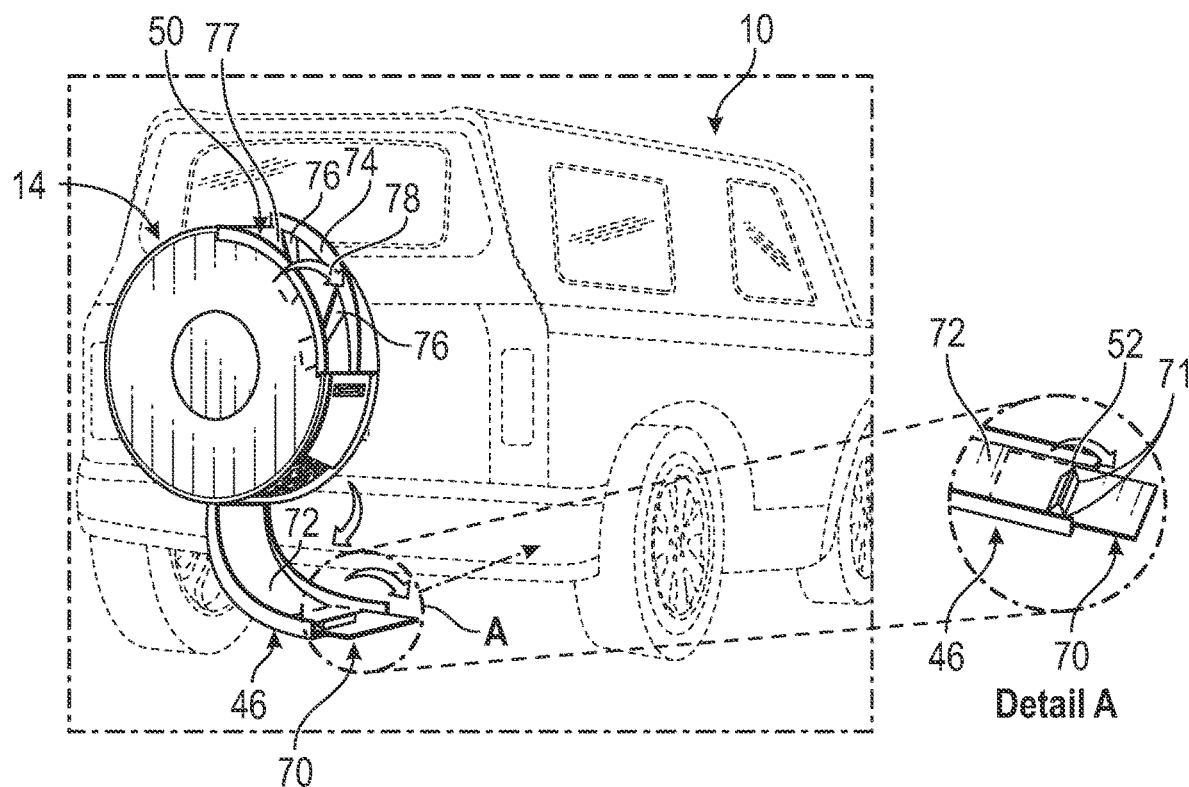
FIG. 7 illustrates exemplary step and handrail features of a spare tire cover system.

FIG. 7 illustrates a plurality of accessory features that may be included as part of the spare tire cover system 14. As a first exemplary accessory feature, the spare tire cover system 14 may include a deployable step 70. The deployable step 70 may be rotatably connected to the deployable ramp 46 and may be moved between a stowed position in which the deployable step 70 is received against a ramp surface 72 of the deployable ramp 46 and a deployed position in which the deployable step 70 is rotated outward of the deployable ramp 46 (see inset A of FIG. 7). The deployable step 70 may include a cutout 71 for accommodating the wheel stop 52 when moving between the stowed and deployed positions. The deployable step 70 provides a surface for which a user may step, such as when reaching for items stowed on an upper surface of the vehicle 10, for example. In some implementations, additional deployable steps could be provided at varying height levels of the spare tire cover system 14 to provide increased utility and convenience.

As a second exemplary accessory feature, the spare tire cover system 14 may include a deployable handrail 74. The deployable handrail 74 may be rotatably connected to the top panel 50 via one or more rail supports 76. The deployable handrail 74 may be moved between a stowed position in which the deployable handrail 74 is received against a circumferential surface 77 of the top panel 50 and a deployed position in which the deployable handrail 74 is rotated outward of the top panel 50 (schematically illustrated by arrow 78). The deployable handrail 74 provides a fixed structure that may be grasped by the user, such as when reaching for items stowed on the upper surface of the vehicle 10, for example. Additional deployable handrails could be provided on the top panel 50 or elsewhere as part of the spare tire cover system 14.

Figure 8:
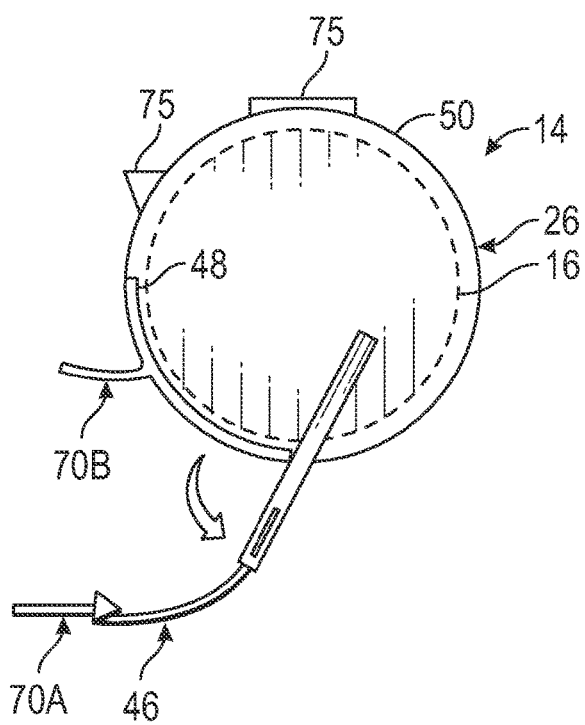
FIG. 8 illustrates additional features of a spare tire cover system.

FIG. 8 illustrates additional features that can be incorporated into the carrier portion 26 of the spare tire cover system 14 for assisting users, such as when attempting to access the upper surface of the vehicle 10. In this embodiment, the deployable ramp 46 may include a first deployable step 70A, the wheel catcher 48 may include a second deployable step 70B, and the top panel 50 may include one or more rumble pads 75. The various steps/rumble pads may be provided at different height levels of the spare tire cover system 14 for assisting users when stepping up to access the upper surface of the vehicle 10.

Figure 9:
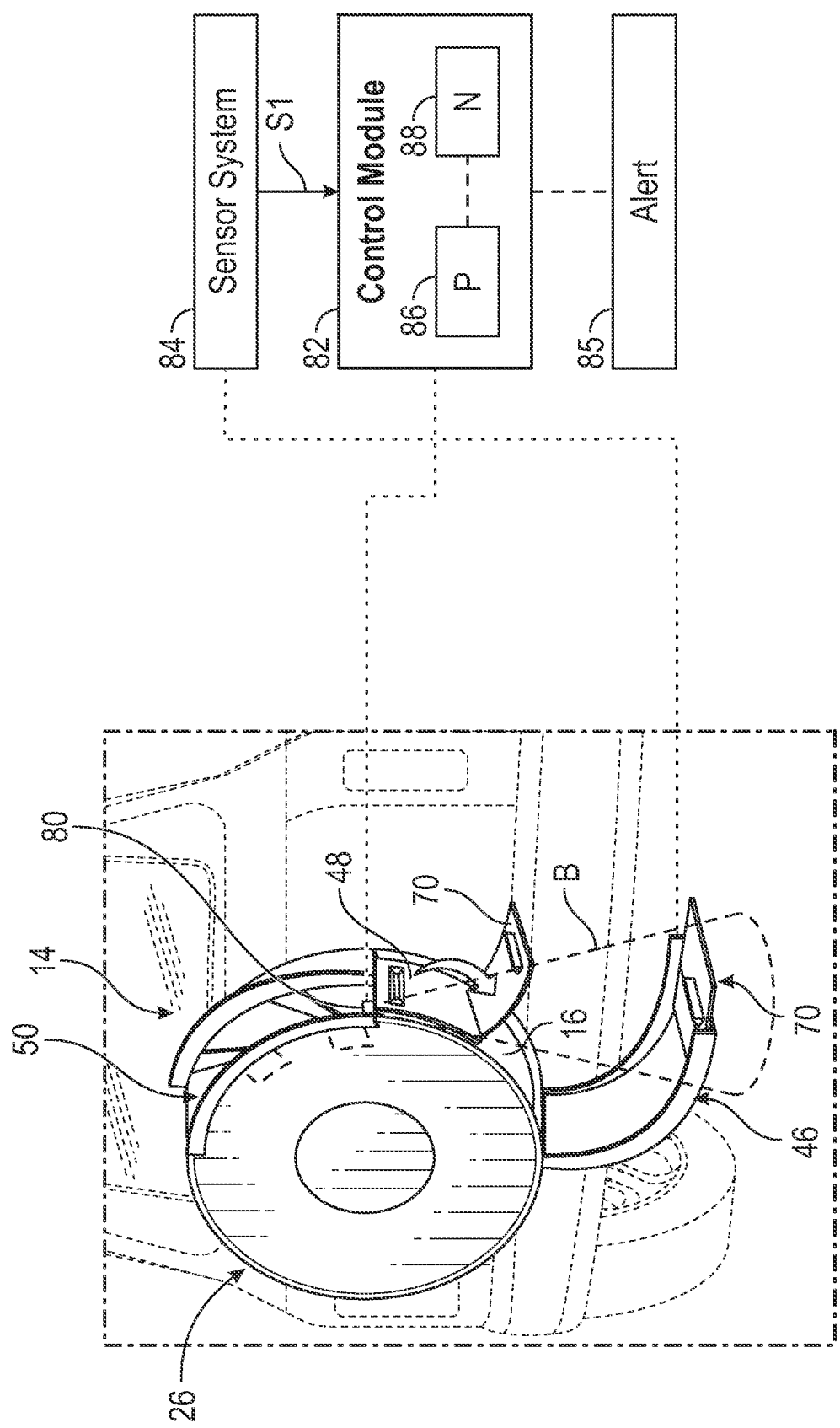
FIG. 9 illustrates additional features of a spare tire cover system.

FIG. 9 illustrates additional accessory features that may be included as part of the spare tire cover system 14. As a further accessory feature, one or more light sources 80 may be provided for illuminating aspects of the spare tire cover system 14. Each light source 80 may be a light emitting diode (LED), for example. However, other light sources could alternatively be utilized within the scope of this disclosure.

The light source 80 may be provided within the top panel 50 of the carrier portion 26. The light source 80 may be recessed in a submarine configuration such that users cannot see the light source 80 when casually viewing the top panel 50. The submarine configuration produces a downward projecting, narrow light beam B that may illuminate one or more of the deployable steps 70 or other desired features but does not shine directly into the eyes of bystanders.

A control module 82 may be operably linked to the light sources 80 and a sensor system 84 of the spare tire cover system 14. The control module 82 may be equipped with executable instructions for interfacing with and commanding operation of various components of the spare tire cover system 14. The control module 82 may include a processing unit 86 and non-transitory memory 88 for executing the various control strategies and modes of the spare tire cover system 14. The processing unit 86 can be programmed to execute one or more programs stored in the memory 88. The programs may be stored in the memory 88 as software code, for example. Each program stored in the memory 88 may include an ordered list of executable instructions for implementing logical functions associated with the spare tire cover system 14. The processing unit 86 can be a custom made or commercially available processor, a central processing unit (CPU), or generally any device for executing software instructions. The memory 88 can include any one or combination of volatile memory elements and/or non-volatile memory elements.

In an embodiment, the control module 82 may automatically command the light source 80 to illuminate based on feedback from the sensor system 84. For example, the sensor system 84 may communicate a signal S1 to the control module 82 in response to detecting that the deployable ramp 46 has been moved to the deployed position. In response to receiving the signal S1, the control module 82 may activate light source 80 for providing the light beam B.

The control module 82 may, in another embodiment, control the color and brightness of the light source 80. The light source 80 may thus be configured to produce various lighting functions that are designed to enhance the user experience.

The control module 82 may, in another embodiment, command that an alert 85 be issued when the deployable ramp 46 is moved to the deployed position and/or when a key fob/passive entry device is not located within a predefined range of the vehicle 10 when a user is detected as attempting to access the spare tire 16. The alert 85 may automatically be displayed on a human machine interface (i.e., passenger cabin infotainment system, linked smart device, etc.) associated with the vehicle 10, for example.

The spare tire cover systems of this disclosure provide increased functionality compared to known spare tire covers. Furthermore, the exemplary spare tire cover systems described herein facilitate improved ease of use when raising/lowering a spare tire to/from a vehicle mounted position, thereby improving customer satisfaction.

Although the different non-limiting embodiments are illustrated as having specific components or steps, the embodiments of this disclosure are not limited to those particular combinations. Some of the components or features from any of the non-limiting embodiments may be used in combination with features or components from any of the other non-limiting embodiments.

It should be understood that like reference numerals identify corresponding or similar elements throughout the several drawings. Although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A spare tire cover system for a vehicle, comprising:
a base portion;
a carrier portion slidable toward and away from the base portion and configured to support a spare tire; and
a deployable ramp configured to move between a stowed position and a deployed position relative to the carrier portion,
wherein the carrier portion includes a lug mount that is slidable relative to an inner sleeve of the base portion.

2. The spare tire cover system as recited in claim 1, comprising a mounting portion configured to mount the base portion to a door panel of the vehicle.

3. The spare tire cover system as recited in claim 1, wherein the spare tire is mountable to the lug mount.

4. The spare tire cover system as recited in claim 1, wherein the deployable ramp is received against a wheel catcher of the carrier portion when in the stowed position and is located closer to a ground surface when in the deployed position.

5. The spare tire cover system as recited in claim 4, wherein the wheel catcher is an integral component of a pivotable top panel of the carrier portion.

6. The spare tire cover system as recited in claim 1, comprising a light source secured to the carrier portion.

7. The spare tire cover system as recited in claim 6, wherein a control module is configured to control a lighting effect emitted by the light source.

8. The spare tire cover system as recited in claim 1, wherein the deployable ramp includes a wheel stop.

9. A spare tire cover system for a vehicle, comprising:
a base portion;
a carrier portion slidable relative to the base portion and configured to support a spare tire; and
a deployable ramp configured to move between a stowed position and a deployed position relative to the carrier portion,
wherein the deployable ramp includes a deployable step.

10. A vehicle, comprising:
a door panel; and
a spare tire cover system mounted to the door panel,
wherein the spare tire cover system includes a deployable ramp adapted to move between a stowed position and a deployed position for assisting in raising/lowering a spare tire to/from a mounted position,
wherein the deployable ramp moves toward either a passenger side or a driver side of the vehicle when moved from the stowed position to the deployed position,
wherein the spare tire cover system includes a top panel adapted to move between a stowed position and a deployed position.

11. The vehicle as recited in claim 10, comprising a strut assembly configured to guide the deployable ramp between the stowed position and the deployed position.

12. The vehicle as recited in claim 11, wherein the strut assembly includes a fixed strut, a slotted link, and an assist spring.

13. The vehicle as recited in claim 10, wherein the deployable ramp is received against a wheel catcher of the spare tire cover system when in the stowed position and is displaced from the wheel catcher when in the deployed position.

14. The vehicle as recited in claim 13, wherein the wheel catcher includes a deployable step.

15. The vehicle as recited in claim 10, wherein the deployable ramp includes a wheel stop.

16. The vehicle as recited in claim 10, wherein the deployable ramp includes a deployable step.

17. The vehicle as recited in claim 10, wherein the top panel includes a deployable handrail.

18. The vehicle as recited in claim 10, wherein the deployed position of the deployable ramp is closer to a ground surface than the deployed position of the top panel, and the deployed position of the top panel is further from the ground surface than the deployed position of the deployable ramp.

* * * * *